(12) United States Patent
Lammers et al.

(10) Patent No.: US 9,147,431 B2
(45) Date of Patent: Sep. 29, 2015

(54) MULTI-SENSOR DATA TRANSDUCER

(71) Applicant: Seagate Technology LLC, Cupertino, CA (US)

(72) Inventors: Todd Michael Lammers, Lafayette, CO (US); Robert Matousek, Berthoud, CO (US); William Michael Radich, Longmont, CO (US)

(73) Assignee: Seagate Technology LLC, Cupertino, CA (US)

( * ) Notice: Subject to any disclaimer, the term of this patent is extended or adjusted under 35 U.S.C. 154(b) by 0 days.

(21) Appl. No.: 13/960,443

(22) Filed: Aug. 6, 2013

(65) Prior Publication Data

US 2015/0043098 A1    Feb. 12, 2015

(51) Int. Cl.
| | | |
|---|---|---|
| *G11B 21/02* | (2006.01) | |
| *G11B 5/09* | (2006.01) | |
| *G11B 20/10* | (2006.01) | |
| *G11B 5/55* | (2006.01) | |

(52) U.S. Cl.
CPC .......... *G11B 20/10268* (2013.01); *G11B 5/556* (2013.01)

(58) Field of Classification Search
None
See application file for complete search history.

(56) References Cited

U.S. PATENT DOCUMENTS

| | | |
|---|---|---|
| 4,575,775 A | 3/1986 | Albrecht |
| 5,448,539 A | 9/1995 | Kamioka |
| 6,104,562 A | 8/2000 | Ottesen et al. |
| 6,381,210 B1 | 4/2002 | Alon et al. |
| 6,674,618 B2 | 1/2004 | Engel et al. |
| 6,977,970 B2 | 12/2005 | Shim et al. |
| 7,259,927 B2 | 8/2007 | Harris |
| 7,271,970 B2 | 9/2007 | Tsuchiya |
| 7,436,632 B2 | 10/2008 | Li et al. |
| 7,936,175 B2 | 5/2011 | Kirkelund et al. |
| 8,139,301 B1* | 3/2012 | Li et al. .......................... 360/39 |
| 8,390,948 B2 | 3/2013 | Hogg |
| 2011/0141629 A1* | 6/2011 | Braganca et al. ............. 360/313 |
| 2012/0206830 A1* | 8/2012 | Gao et al. ........................ 360/61 |

* cited by examiner

*Primary Examiner* — Regina N Holder
(74) *Attorney, Agent, or Firm* — Hall Estill Attorneys at Law (57) ABSTRACT

Method and apparatus for decoding data, such as from a rotatable magnetic recording medium. In accordance with some embodiments, a plurality of sensors is provided, with each sensor configured to generate a sense signal from an adjacent pattern. A processing circuit is configured to decode data from the adjacent pattern using the generated sense signals.

19 Claims, 7 Drawing Sheets

MULTI-SENSOR DATA TRANSDUCER

SUMMARY

Various embodiments of the present disclosure are generally directed to the use of multiple sensors to decode a data pattern, such as from a rotatable magnetic recording medium.

In accordance with some embodiments, a plurality of sensors is provided with each sensor configured to generate a sense signal from an adjacent pattern. A processing circuit is configured to decode data from the adjacent pattern using the generated sense signals.

These and other features and aspects which characterize various embodiments of the present disclosure can be understood in view of the following detailed discussion and the accompanying drawings.

BRIEF DESCRIPTION OF THE DRAWINGS

FIG. 3 is a perspective view of the data storage device of FIG. 2 in accordance with some embodiments.

DETAILED DESCRIPTION

Data storage devices store and retrieve computerized data in a fast and efficient manner. Some data storage devices such as hard disc drives (HDDs), hybrid devices, optical devices, etc. store data in the form of tracks on one or more rotatable data storage media (discs). A data read transducer (sensor) can be positioned adjacent the tracks using an actuator assembly to read back data stored to the media.

A continuing trend in the industry is to provide storage devices with ever higher data storage capacities and data densities. This raises a number of challenges with regard to accurately decoding stored patterns from tracks, particularly in high track density environments where track misregistration (TMR) can reduce the ability of the transducers to be maintained adjacent the tracks within requisite tolerances.

Accordingly, various embodiments of the present disclosure are generally directed to an apparatus and method for using multiple sensors to decode a data pattern. As explained below, a readback system is provided having multiple sensors which are positionable adjacent a pattern, such as a magnetic data pattern on a track defined on a rotatable storage surface. Sensor signals from the respective multiple sensors are used to decode data stored to the tracks.

In some embodiments, a processing circuit evaluates the sensor signals from the respective sensors and selects a best signal for use in decoding the data. In further embodiments, the sensor signals from at least some of the sensors are combined to provide a composite readback signal that is decoded to provide the originally stored data from the track. In further embodiments, servo positioning control signals are generated from the respective sensor signals to improve the positioning of the sensors relative to the tracks. In still further embodiments, data are concurrently recovered from multiple tracks using the multiple sensors in a multi-track (e.g., two-dimensional, or 2D) recording environment.

Figure 1:
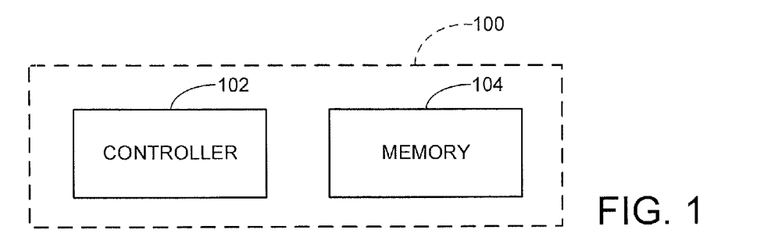
FIG. 1 is a functional representation of a data storage device.

These and other features can be understood beginning with a review of FIG. 1 which provides a functional block representation of a generalized data storage device 100. The device 100 includes a controller 102 and a memory 104. The controller 102 can take a variety of forms such as a hardware based control circuit or a general purpose programmable processor having suitable programming to provide top level control for the device. The memory 104 can take a variety of forms such as rotatable magnetic or optical data recording media (discs), hybrid memory modules (e.g., both rotatable and solid-state memory), etc.

Figure 2:
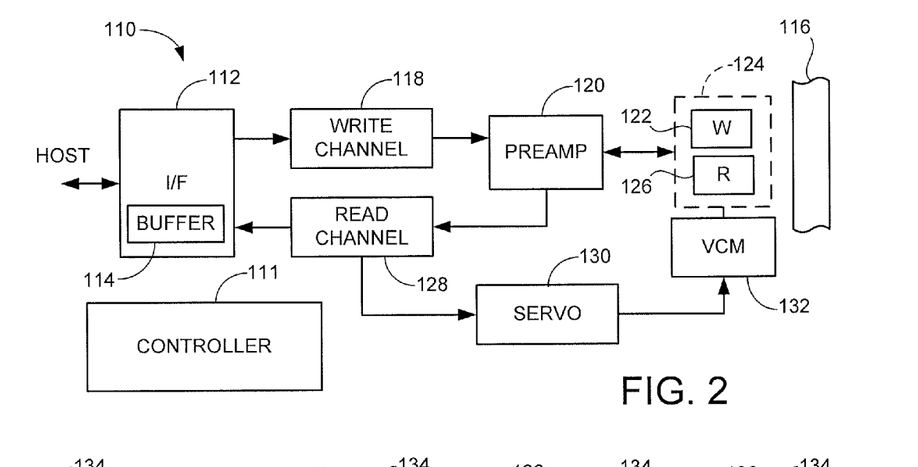
FIG. 2 is a functional representation of another data storage device.

FIG. 2 is a functional block diagram for a data storage device 110 that may correspond to the device 100 of FIG. 1 in accordance with some embodiments. The data storage device 110 is characterized for purposes of the present disclosure as a hard disc drive (HDD) that employs magnetic recording to store data from a host device (not separately shown). The HDD may use a variety of recording technologies such as but not limited to heat assisted magnetic recording (HAMR), perpendicular recording, bit patterned media, etc. Such alternatives are merely exemplary and are not limiting.

The device 110 in FIG. 2 includes a top level controller 111 that may be realized in hardware or firmware. An interface circuit (I/F) 112 communicates with the host device and includes a data buffer 114 to temporarily store data pending transfer between the host device and a rotatable perpendicular data recording medium 116.

A write channel 118 operates to encode input write data from the host to provide a serialized data stream to a preamplifier/driver (preamp) 120. The preamp 120 provides a sequence of write currents to a perpendicular magnetic write element (W) 122 of a data transducer 124 to write data to the medium 116.

During a read operation, readback signals are transduced by a number of read sensors (R) 126 of the data transducer 124. The sensors may take the form of magnetically responsive sensors (such as magneto-resistive (MR) sensors), or may take some other form. The transduced sensor signals are supplied to the preamp 120. The preamp 120 conditions and amplifies the readback signals and provides the same to a read channel 128. The read channel 128 applies signal processing techniques to recover the originally stored data to the buffer 114 pending subsequent transfer to the host.

During both read and write operations, specially configured servo positioning data provided to the medium 116 are transduced by the read element 126 and, after demodulation by a portion of the read channel 128, are supplied to a servo control circuit 130. The servo control circuit 130 provides positional control signals to a voice coil motor (VCM) 132 coupled to the data transducer 124 to position the respective write and read elements 122, 126 adjacent various data tracks defined on the medium 116.

Some or all aspects of the read and write channels, the I/F, the controller and/or the servo circuit may be incorporated into one or more integrated system on chip (SOC) devices on a printed circuit board (PCB, not shown) mounted to a disc drive housing that supports the electromechanical aspects of the device (VCM, heads, preamp, media, etc.).

It is contemplated that the transducer 124 takes a multi-sensor construction so that multiple read sensors 126 are arranged to detect data from a selected surface of the media 116. FIGS. 3A-3D illustrate different multi-sensor arrangements. Other multi-sensor configurations are contemplated and will readily occur to the skilled artisan in view of the present disclosure, and so the example configurations are merely exemplary and are not limiting. The relative sizes and aspect ratios are representative and not necessarily drawn to scale.

Figure 3A:
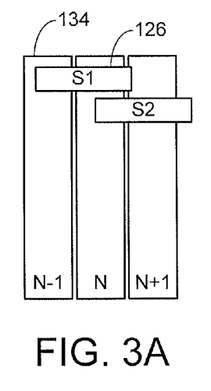
FIGS. 3A-3D depict different arrangements of sensors adjacent corresponding tracks in the data storage device of FIG. 3.

FIG. 3A depicts a two sensor arrangement with read sensors 126 (S1 and S2) which respectively overlap and span three adjacent tracks 134. The tracks are arbitrarily denoted as N, N−1 and N+1. While not limiting, it is contemplated that the sensors S1-S2 are configured to sense data from a selected track, in this case track N. As explained below, the use of multiple sensors improves the ability of the device 110 to recover data from the tracks in view of track misregistration (TMR) and other effects that tend to cause misalignment between the sensors and the tracks. From the relative dimensions of the sensors and the tracks, it can be seen that a significant amount of TMR (e.g., side-to-side displacement of the sensors) can be accommodated while still recovering the data from a target track.

Figure 3B:
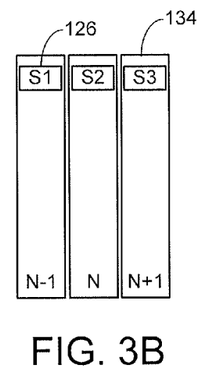

FIG. 3B depicts a three sensor arrangement with read sensors 126 (S1-S3) nominally aligned with three adjacent tracks 134 (tracks N−1, N and N+1). In FIG. 3B, the sensors 126 do not overlap and are radially aligned with the associated tracks 134. As before, the sensors S1-S3 generally operate to recover data from a selected track (in this case, track N). As before, a significant amount of TMR can be accommodated by the system. For example, significant displacement of the sensors S1-S3 to the right relative to track N can allow the data from track N to be obtained using the output of sensor S1. Similarly, significant displacement of the sensors to the left can allow the data from track N to be obtained from using the output of sensor S3.

Figure 3C:
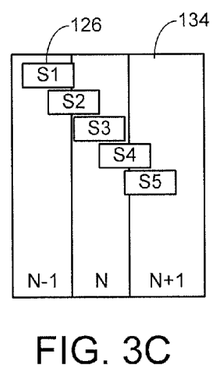

FIG. 3C shows another arrangement with overlapping sensors S1-S5 adjacent tracks N−1, N and N+1. The tracks 134 are overlapping (shingled) tracks so that each subsequently written track overlaps a portion of an immediately previously written track. This is merely for purposes of illustration and is not limiting. Shingled tracks can be applied to FIGS. 3A and 3B, and non-shingled tracks can similarly be used in FIG. 3C. As before, the sensors S1-S5 are overlapping and arranged to detect data from the center track N.

Figure 3D:
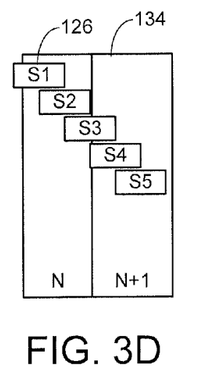

FIG. 3D is yet another arrangement of sensors 126 (S1-S5) adjacent a pair of tracks 134 (N and N+1). The tracks are shown to be shingled, but this is merely exemplary. In FIG. 3D, so-called two dimensional (2D) recording is used so that data are concurrently recovered from both tracks N and N+1. In this case, nominally sensors S1 and S2 are used to recover data from track N, sensors S4 and S5 are used to recover data from track N+1, and intermediate sensor S3 can be used to recover data from either track. Other relative numbers and arrangements of sensors and tracks can be used. Generally, X sensors will collectively span Y tracks, where X and Y are both plural numbers which may or may not be equal.

Figure 4A:
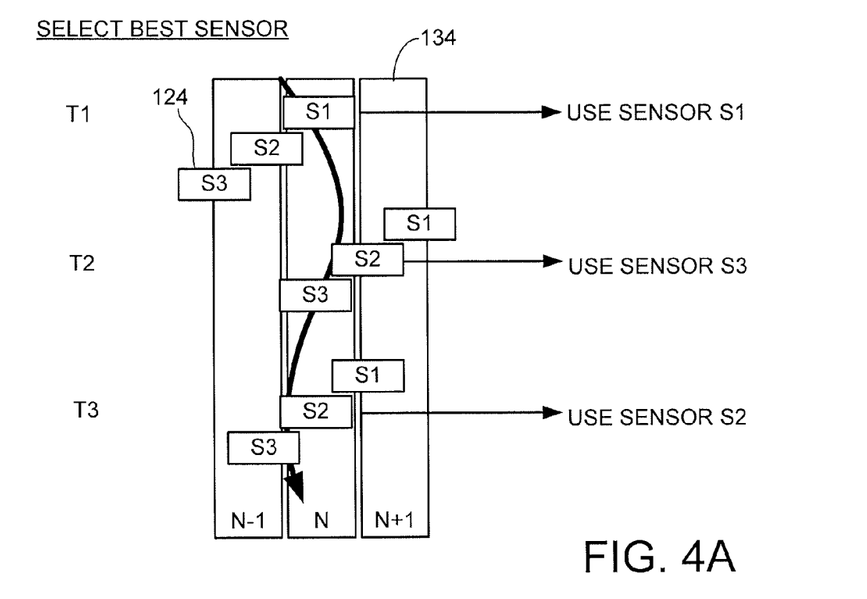
FIGS. 4A-4C depict the transducing of data from multiple sensors in accordance with various embodiments.
Figure 4B:
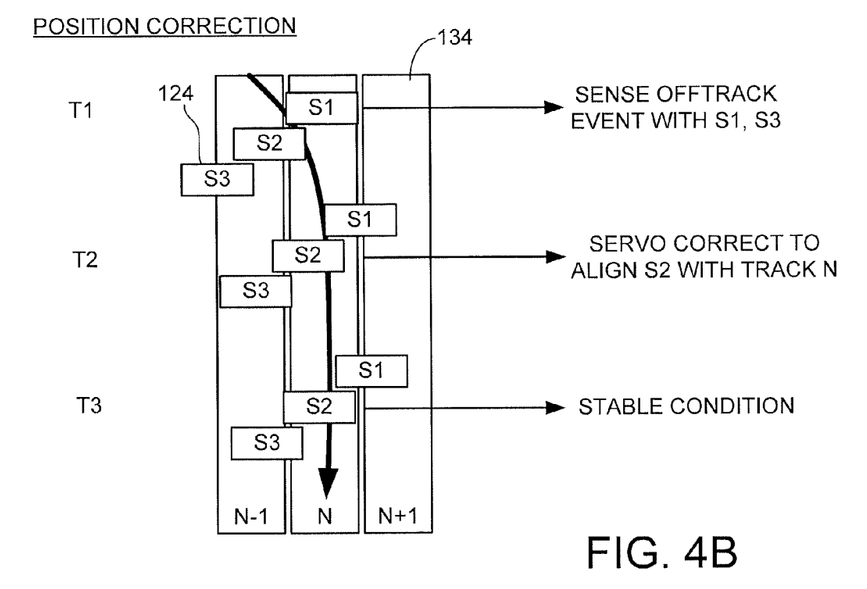
Figure 4C:
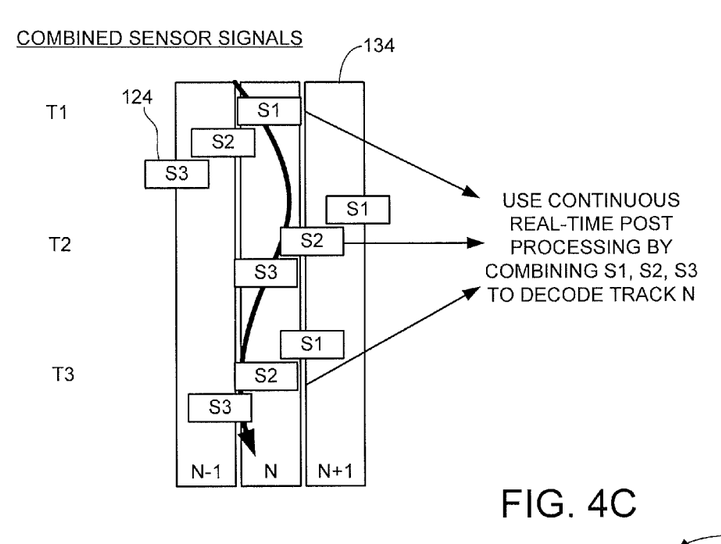

FIGS. 4A-4C depict different operations that can be carried out by the multi-sensor arrangements of the present disclosure in accordance with various embodiments. FIG. 4A shows a "select best sensor" operation whereby three sensors S1-S3 are used to decode data from a selected track 134 (track N). Three subsequent time intervals are depicted at times T1, T2 and T3.

At time T1, sensor S1 is best aligned with track N and therefore the output signals from sensor S1 are used to detect the data from track N. At time T2, sensor S3 is best aligned with track N and used to detect the data from track N. At time T3, sensor S2 is best aligned with track N and used to detect the data from track N. During subsequent time intervals, the sensor having the best alignment will be used to provide the readback signal to decode the data. In this context, "best alignment" refers to the sensor providing a readback signal having an optimum signal to noise ratio (SNR), which will generally correspond to the sensor which is physically closest to the associated track. Other metrics can be used to identify the optimum sensor as explained below.

FIG. 4B shows a "position correction" operation which may be carried out in lieu of or in addition to, the operation of FIG. 4A. As before, three sensors S1-S3 are nominally maintained adjacent three tracks N−1, N and N+1, with the system operating to recover data from the center track N. At time T1, sensor S1 is used to recover data from track N.

In addition, the relative SNR values of the output from the sensors S1-S3 will indicate an offtrack condition (e.g., presence of TMR), meaning that the sensors are displaced to the left relative to the center of track N. A correction signal can be supplied to a servo control system (e.g., servo circuit 130, FIG. 2) to improve alignment of the sensors relative to track N, as denoted at time T2. Data may also be transduced using sensor S2 at time T2. At time T3, stable alignment is detected and data continue to be recovered using sensor S2. In some cases, the sensors can be used for misalignment detection without the transducing of data from the target track. In other cases, both data recovery and servo alignment can be carried out concurrently using the sensor signals.

FIG. 4C illustrates a "combined sensor signals" operation that can be carried out in lieu of, or in addition to, the position correction of FIG. 4B. The three sensors S1-S3 are arranged adjacent the three tracks N−1, N and N+1 as before. Components of each of the output signals from sensors S1, S2 and S3 are combined to provide a composite signal that is used to recover data from track N. It can be seen that the composite signal may use information from sensor S1 at time T1, information from sensor S3 at time T2 and information from sensor S2 at time T3. The combined signal may switch between different sensor outputs or may consolidate multiple components from multiple signals, as explained below.

Figure 5:
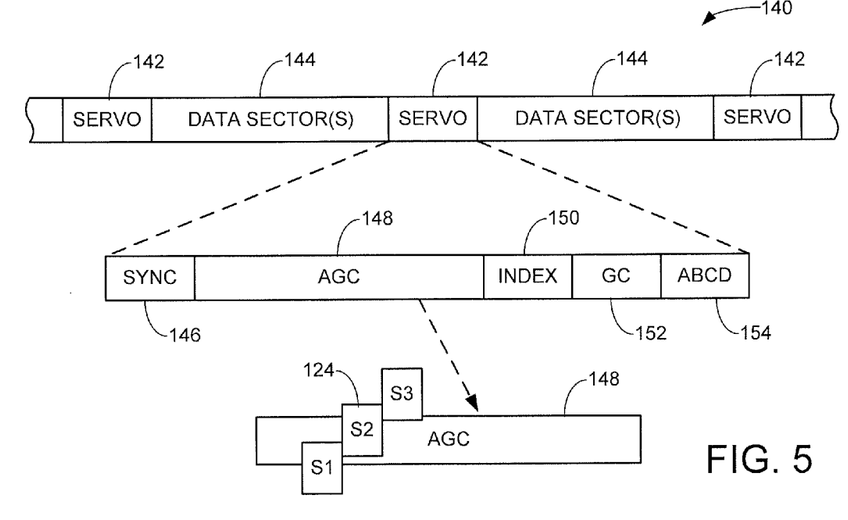
FIG. 5 is an example data format for the medium of FIG. 2.

FIG. 5 shows an example format for a selected track 140 that can be followed using the sensors in FIGS. 4A-4C. The track 140 extends circumferentially about a central axis of the medium 116 (FIG. 2) and includes a plurality of servo wedges (fields) 142 which extend radially around the medium like spokes on a wheel. Fixed sized data sectors 144 are defined in the spaces between adjacent servo fields 142 along the selected track 140 to store user data from the host.

The servo fields 142 provide control information to the servo circuit 130 (FIG. 2) to enable the servo circuit to determine the relative position of the transducer 124 and to correct the position to reduce TMR. The example servo fields 142 include a synchronization (sync) field 146, an automatic gain control (AGC) field 148, an index field 150, a Gray code field 152 and an ABCD dibit burst field 154. Other fields and arrangements can be used.

The sync field 146 provides a unique bit pattern that indicates commencement of a servo field. The AGC field 148 provides an oscillating pattern (such as a 2T pattern) at a selected frequency and magnitude to enable the system to set frequency and gain parameters to decode remaining portions of the servo data. The index field 150 indicates angular location of the transducer 124. The GC field 152 indicates radial position in terms of a track address. The ABCD field 154 provides intra-track positional information to indicate the relative position of the transducer with respect to the center of the track.

A sampled observer/estimator model can be used so that the servo control loop obtains information and corrects transducer position at each servo field 142. In addition, the servo control loop makes subsequent estimates of servo position at one or more intermediate locations between the servo fields 142 and provides corrections at these locations as well.

In some embodiments, a selected sensor 126 (S1-S3) is identified at each servo field 142 as the best sensor and thereafter used until the occurrence of the next servo field. This is represented in FIG. 5 as being carried out responsive to the passage of the sensors 126 over the AGC field 148. The selected sensor, such as sensor S2, is thereafter used as the read sensor until the passage of the next AGC field adjacent the transducer.

In other embodiments, a selected sensor is identified at each observed or estimated servo sample, so that the system may switch to different sensors between successive servo fields 142. In still other embodiments, a selected sensor S1-S3 is identified as the best sensor to follow at any time irrespective of the servo frequency, and therefore sensor switching may take place over the servo fields 142 and/or the data sectors 144.

Figure 6:
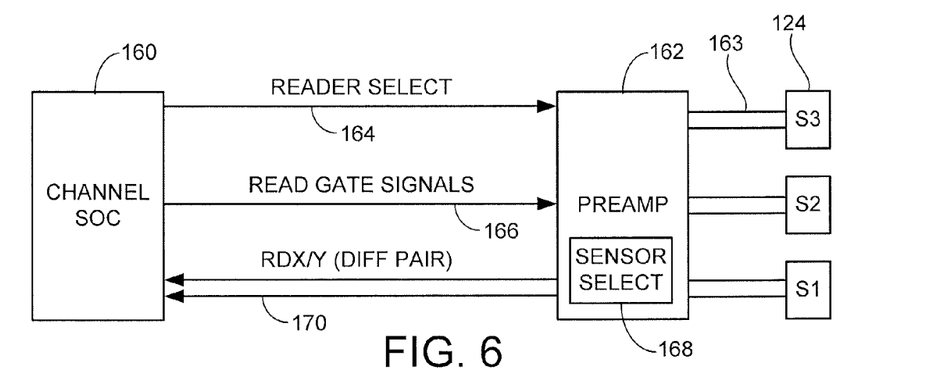
FIG. 6 is a functional representation of processing circuitry for multiple sensors in accordance with some embodiments.

FIG. 6 is a functional representation of a processing circuit portion of the data storage device 110 in accordance with some embodiments. The processing circuit of FIG. 6 includes a channel system on chip (SOC) 160 and a preamp 162. Sensor selections take place at the preamp level.

Differential signal paths 163 are provided between the preamp 162 and each of a plurality of sensors 124 (S1-S3). The SOC 160 forwards various control signals to the preamp 162 during a read operation. These control signals include reader select signals on path 164 and read gate signals on path 166. In response, a sensor selection circuit 168 of the preamp 162 identifies and outputs a read (RDX/Y) signal on a differential signal path 170 to the SOC 160.

The sensor selection circuit 168 evaluates the read back response of each of the sensors S1-S3 and identifies the sensor having the best response (e.g., highest SNR, etc.). Threshold detectors or other circuits can be used to characterize each sensor response, and to identify the best response therefrom. The selection circuit 168 connects the identified sensor output to the differential signal path 170 to return the response from the identified sensor to the SOC 160.

Figure 7:
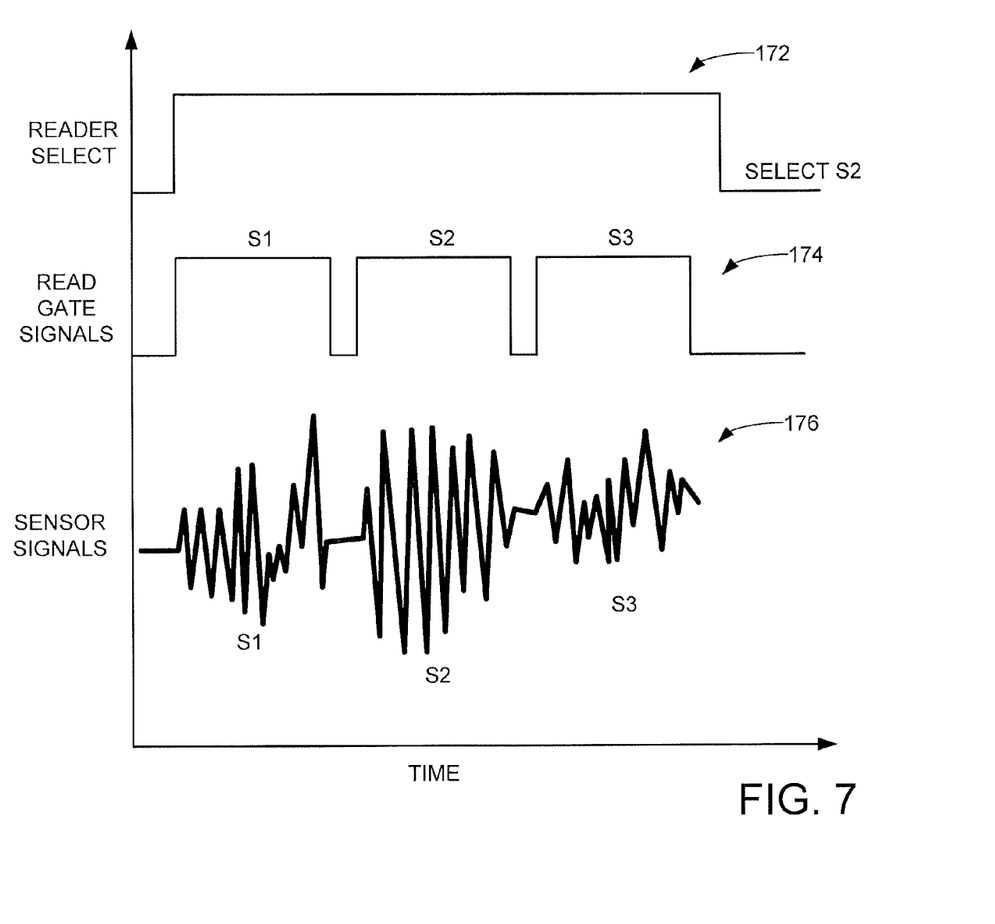
FIG. 7 shows waveforms generated by the processing circuitry of FIG. 6.

FIG. 7 is a graphical representation of various control and data curves from the processing circuitry of FIG. 6. A reader select signal is denoted at 172 and serves to enable the sensor select circuit 168. Read gate signals 174 include individual windows for each of the sensors S1-S3 in turn. Read response signals 176 for each of the sensors 176 are respectively generated during the windows 174. The signals 176 may be obtained as the sensors pass over a selected AGC field 148, as depicted above in FIG. 5. In FIG. 7, sensor S2 provides the best response and is accordingly selected by the sensor selection circuit 168 to forward the readback RDX/Y signal to the SOC 160 on path 170.

The embodiment of FIGS. 6-7 carries out sensor selection operations at the preamp level, but the initiation and timing of the sensor selection operations are governed by the SOC. The SOC receives the readback signals along a single pair of conductors (differential signal path 170) and processes the received signals in an otherwise conventional fashion. In some cases, the SOC 160 initiates the sensor selection process upon receipt of each servo sync signal (sync field 146, FIG. 5) and forwards the read gate signals 174 as the sensors S1-S3 pass adjacent the 2T AGC signal (AGC field 148, FIG. 5). first servo control field.

Figure 8:
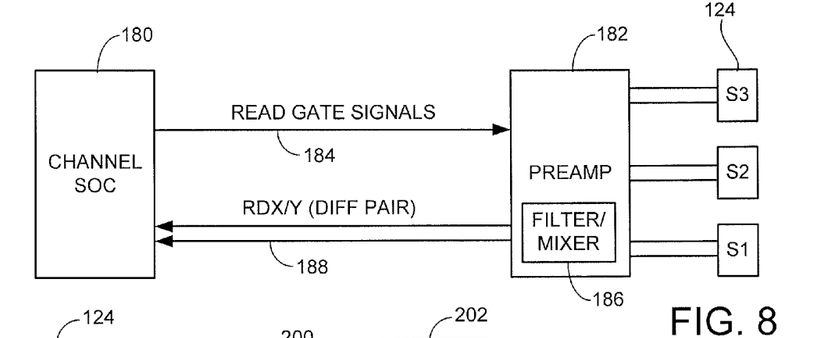
FIG. 8 is a functional representation of other processing circuitry for multiple sensors in accordance with some embodiments.

FIG. 8 is another functional representation of processing circuitry from the device 110 in accordance with some embodiments. A channel SOC 180 communicates with a preamp 182 which in turn is connected to multiple sensors 124 (S1-S3) as before. FIG. 8 employs a continuous real-time decision making architecture where the preamp automatically switches between different sensors at any suitable time, including while the sensors are over user data (sectors 144, FIG. 5).

The SOC 180 forwards read gate signals via path 184 to initiate read operations upon the servo and user data. The preamp uses a filter/mixer circuit 186 to evaluate the respective responses of the sensors 124, and to form a composite readback (RDX/Y) signal which is transferred to the SOC 180 via differential signal path 188.

Figure 9:
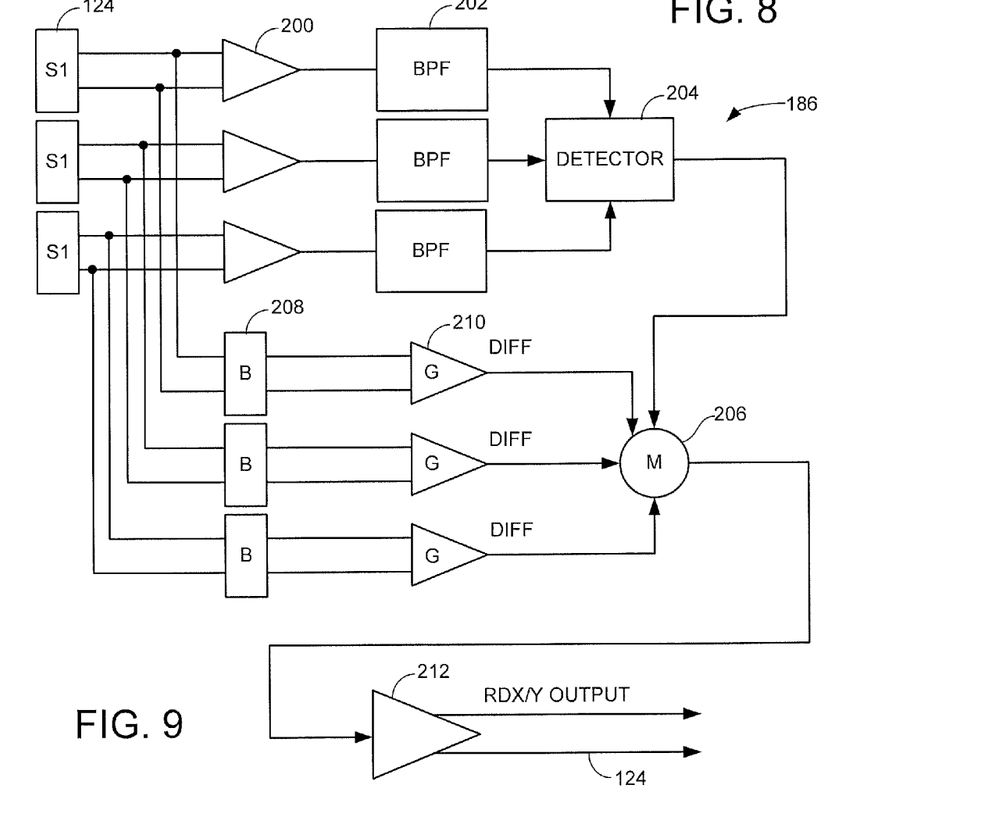
FIG. 9 depicts the preamp of FIG. 8 in accordance with some embodiments.

FIG. 9 shows the filter/mixer circuit 186 in greater detail. FIG. 9 is merely illustrative as the responses from the sensors S1-S3 can be combined in any number of ways to generate a composite signal. Readback response signals from the respective sensors S1-S3 are amplified by amplifiers 200 and filtered by band pass filters (BPF) 202. The amplified and filtered signals are provided to a detector 204 which identifies the sensor having the greatest energy component in a frequency band (spectrum) of interest, which will generally correspond to the sensor best aligned with the target track. The detector 204 can compare the bandpass filtered signal amplitudes to select the sensor having the greatest magnitude, and forward those samples to a mixer 206 (also referred to as a combiner or a switch). Other detection methodologies can be used as desired.

Differential outputs from the sensors 124 can be supplied to the mixer via bias blocks 208 and differential gain amplifiers 210. The resulting combination at the mixer 206 provides a combined signal with outputs at any given time corresponding to the best aligned sensor, as discussed above in FIG. 4C. The combined signal is provided to driver 208 to output the signal to the SOC via differential paths 188. As required, time delays and other effects can be taken into account using delay lines (not shown) to time-align the various responses.

A feature of the embodiment of FIGS. 8-9 is that processing continues to be carried out at the preamp level and a single differential signal is supplied to the SOC as before. The preamp 182 automatically generates the composite readback signal by combining components of the read back response from all (or some) of the sensors S1-S3, so that an initialization signal (e.g., reader select signal in FIGS. 6-7) from the SOC 180 is not required to initiate sensor selection.

Another feature of the embodiment of FIGS. 8-9 is that the switching to different sensors (e.g., from S2 to S1, etc.) can be carried out in real time at any point during a read operation.

Although not depicted in FIG. 8, it will be understood that the preamp 182 can forward a separate signal to the SOC 180 identifying which sensor is being used to generate the output. This can allow the SOC to take further actions such as by adjusting gain levels, making servo corrections, etc.

While the circuit of FIG. 9 is contemplated as selecting different components to form the composite signal, in other embodiments the circuit can be adapted to time-align and combine the respective signals (e.g., adding or subtracting offtrack sensor outputs to the ontrack sensor output) so that the composite signal has a larger component from the ontrack sensor and a smaller component from the offtrack sensor(s) for each section of the composite signal.

Figure 10:
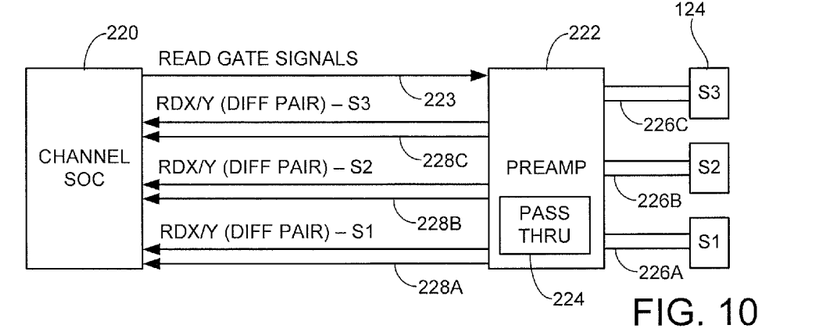
FIG. 10 is a functional representation of other processing circuitry for multiple sensors in accordance with some embodiments.

FIG. 10 provides another configuration in accordance with some embodiments in which a channel SOC 220 communicates with a preamp 222 connected to multiple sensors 124 (S1-S3). In FIG. 10, a fully independent reader implementation is provided so that the preamp acts as a passive pass-through device and all of the sensor signals are forwarded to and processed by the SOC. This approach allows the SOC to utilize more advanced signal processing techniques to extract the main track data, as well as to incorporate sophisticated servo steering corrections based on the respective sensor signals.

Read gate signals are sent from the SOC 220 to the preamp 222 via path 223. The preamp 222 includes a "pass thru" section 224 which enables interconnection of respective differential paths 226A, 226B and 226C with respective differential paths 228A, 228B. In this way, the signal output by sensor 51 is passed along paths 226A and 228A to the SOC 220, and so on. It will be appreciated that this increases the number of differential pairs of paths between the preamp and SOC as compared to previous embodiments, but can also enhance data recovery and TMR response by the SOC 220.

Figure 11:
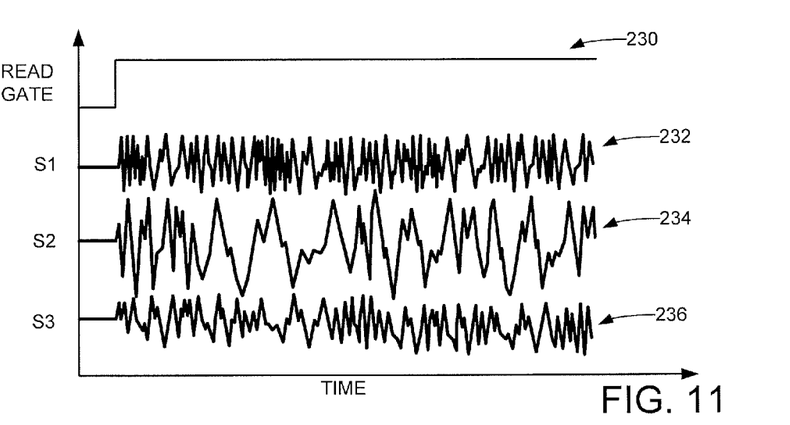
FIG. 11 shows waveforms generated by the processing circuitry of FIG. 10.

FIG. 11 provides example control and data signals from FIG. 10. A read gate signal from the SOC 220 is represented at 230. Read back response signals from the respective sensors S1, S2 and S3 are represented at 232, 234 and 236. As noted above, these respective signals 232, 234 and 236 are forwarded in parallel to the SOC 220.

Figure 12:
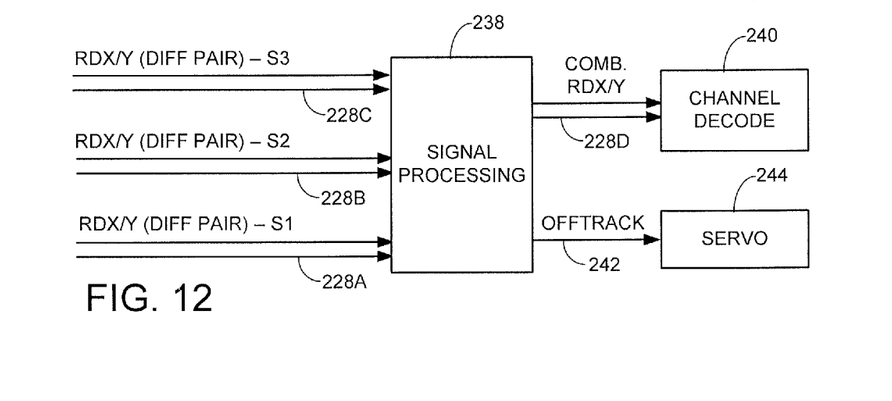
FIG. 12 is a functional representation of other processing circuitry for multiple sensors in accordance with some embodiments.

FIG. 12 represents operational aspects of the SOC 220 in some embodiments. A channel input signal processing block 238 can be used to combine the input sensor signals from paths 228A-228C to form a combined readback (RDX/Y) signal which is passed via path 228D to an otherwise conventional channel decode stage 240. As before, the signal processing block can select the best signal or combine components of multiple signals for a given set of data bits. The signal processing block can further provide an offtrack signal on path 242 to a servo control block 244 to initiate servo corrections as discussed above in FIG. 4B.

The preamp 222 in FIG. 10 can be provided with multiple stages, such as the pass thru block 224 as well as the sensor select block 168 (FIG. 6) and/or the filter/mixer block 186 (FIG. 8). In this way, different preamp modes can be selected by the SOC 220. For example, during one mode of operation the preamp may automatically select the samples to be forwarded to the SOC 220, and during another mode of operation the preamp may transition to the pass thru mode and present all of the samples to the SOC. The switching between modes can be controlled by the SOC 220 responsive to various parameters such as measured bit error rates (BER), channel quality measurements, during read error recovery operations, during periods of higher than normal levels of detected vibration and/or offtrack performance, etc. In cases where a single set of differential signal paths are used to forward signals from the preamp 222 to the SOC 220, a selected one of the paths, such as path 228A, can be used as a default path.

While FIG. 12 conceptually depicts the signal processing block 238 and the channel decode block 240 as separate operations, these operations can be combined into a single multi-channel decoding operation by incorporating the signal processing block 238 into the channel decode block 240.

Figure 13:
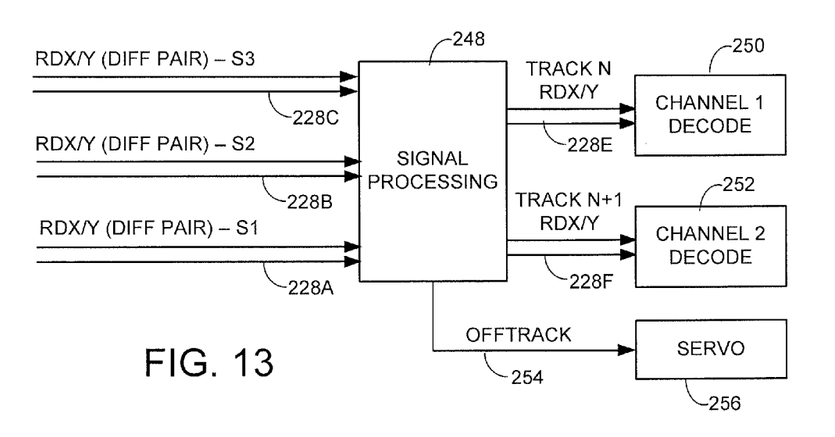
FIG. 13 is a functional representation of other processing circuitry for multiple sensors in accordance with some embodiments.

Embodiments discussed thus far have decoded data from a single target track (e.g., track N in FIGS. 3A-3D). Multi-track decoding can also be performed. FIG. 13 provides an illustrative configuration in accordance with some embodiments in which a channel input signal processing block 248 receives multiple sensor signals as before. However, the signal processing block 248 concurrently combines the input sensor signals to provide multiple combined signals for a first track (track N) and for a second track (track N+1). These respective combined signals are forwarded via paths 228E and 228F to respective channel 1 decode and channel 2 decode blocks 250, 252.

Depending on the respective positions of the sensors S1-S3 relative to the target tracks N and N+1, the output from sensor S1 may be used to decode track N and the output from sensors S2 and S3 may be used to decode track N+1. Should the transducer drift so that intermediate sensor S2 becomes closer to track N, the system may switch so that track N is decoded using sensors S1 and S2 and track N+1 is decoded using sensor S3. Multiple combinations of the signals may be used to provide a best predicted response for a single or multiple tracks. As before, offtrack signals may be passed via path 254 to a servo stage 256 for TMR adjustments.

In a multi-track decoding environment, the recovered data can be two separate sets of data with one set of data on each track, so that data sectors from track N are recovered concurrently with the recovery of data sectors from track N+1. Alternatively, the user data may be distributed across multiple (two or more) tracks so that each data sector is recovered by transducing data from multiple tracks.

In each of the foregoing embodiments, any number of multiple tracks can be concurrently accessed. Similarly, any plural number of sensors can be used. The sensors may be adjacent, overlapping or non-overlapping, radially aligned or radially offset, same sized or different sized, having the same construction or different constructions, etc. While magnetic sensing has been used for the various example configurations, other sensing mechanisms can be used including electrical, optical, magneto-optical, proximity sensing, etc. In some cases, different styles of sensors can be used to obtain different sensor signals which are then selected and/or combined as discussed above to provide a final data decoding signal.

Figure 14:
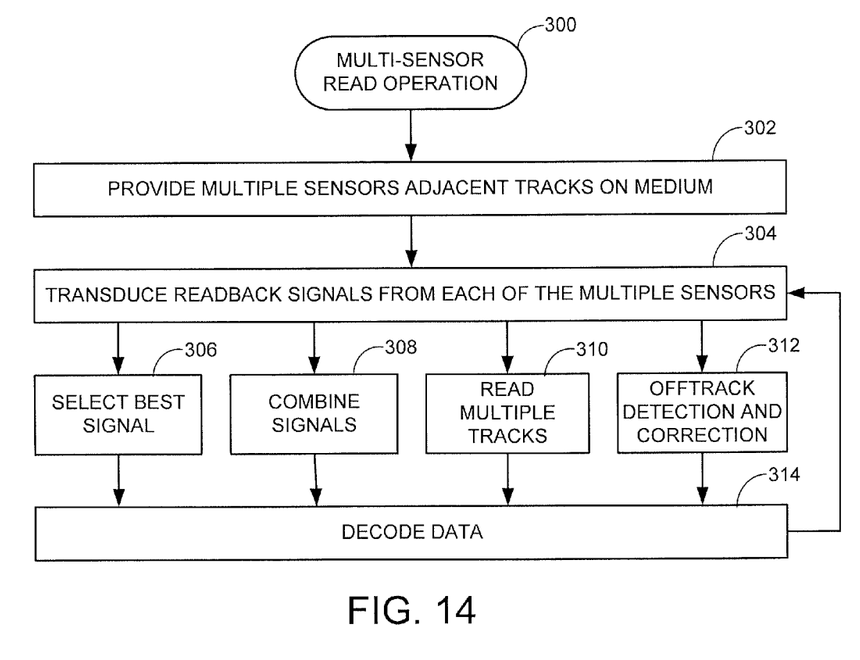
FIG. 14 is a flow chart for a MULTI-SENSOR READ OPERATION routine carried out in accordance with some embodiments.

FIG. 14 provides a flow chart for a MULTI-SENSOR READ OPERATION routine 300 generally illustrative of steps that may be carried out in accordance with the foregoing discussion. The flow of FIG. 14 will be discussed using the example data storage device 110 of FIG. 2, although such is merely illustrative and is not limiting.

Multiple sensors are provided adjacent tracks on a storage medium at step 302, such as depicted in the various arrangements of FIGS. 3A-3D and 4A-4C. The tracks may take a format as generally depicted in FIG. 5. Other arrangements can be formed during this step as well including interconnecting the sensors with a preamp, a channel SOC, etc.

Readback signals are transduced from the respective sensors at step 304. This may be initiated responsive to a read gate signal from a channel SOC. The signals from the sensors can be evaluated in a variety of ways, including multiple ways at the same time.

Step 306 denotes a select best signal strategy where the respective sensor signals are evaluated and the signal from the sensor having optimum performance characteristics, such as higher SNR, is forwarded for processing. This is discussed including by the embodiment of FIGS. 6-7.

Step 308 denotes a combined signal strategy where a combined readback signal is formed using multiple sensor signals. This includes the embodiments of FIGS. 8-13 where different sensor signals may be switched into the output signal or components from multiple signals are concurrently combined. This may take place at a preamp level or an SOC level.

Step 310 denotes a multi-track strategy wherein data are concurrently transduced from multiple tracks, as discussed above in FIG. 13. Multi-track reading can use a best sample strategy or a combined sample strategy as desired. Step 312 provides offtrack detection and correction steps that may be carried out to provide offtrack correction of TMR. Once the input signals are evaluated, the signals are used to decode data from the target track(s), as denoted at step 314.

It will now be appreciated that the various embodiments presented herein can provide a number of benefits. Improved data decoding operations can take place by selecting the best sensor from a plurality of sensors adjacent a common pattern to provide the readback sense signal. Forming a composite signal from multiple sensors can also enhance data decoding. Real time servo corrections can be made in sensor alignment based on the respective sensor signal amplitudes. Shingled (overlapping track) recording and multi-track reading (two-dimensional (2D) recording) can be supported.

In some embodiments it is contemplated that the use of multiple sensors as disclosed herein can allow further gains in data storage capacity and readback performance by combining shingled and 2D recording. Unlike two-sensor and two-track systems where the relative spacing of the tracks is largely defined by the operational distance of the two sensors, using a greater number of sensors than tracks can allow the two tracks (or other plural numbers of concurrently read tracks) to be squeezed together in a closer arrangement, since track spacing/pitch/width are largely independent of sensor spacing using the system as embodied herein.

It is to be understood that even though numerous characteristics and advantages of various embodiments of the present disclosure have been set forth in the foregoing description, together with details of the structure and function of various embodiments disclosed, this detailed description is illustrative only, and changes may be made in detail, especially in matters of structure and arrangements of parts within the principles of the present disclosure to the full extent indicated by the broad general meaning of the terms in which the appended claims are expressed.

What is claimed is:

1. An apparatus comprising:
a plurality of sensors each configured to generate sense signals from an adjacent pattern comprising first and second tracks having spaced apart servo control fields, a first sensor of the plurality of sensors selected to decode data from the first track responsive to the generated sense signals obtained from a first servo control field, and a different, second sensor selected to decode data from the second track responsive to the generated sense signals obtained from a second control field; and
a processing circuit configured to decode data from the adjacent pattern using the generated sense signals to concurrently decode the data from each of the first and second tracks.

2. The apparatus of claim 1, wherein the plurality of sensors are supported by a transducer assembly adjacent a rotatable data storage surface and the first and second tracks in the adjacent pattern on the data storage surface.

3. The apparatus of claim 1, wherein each of the generated sense signals has a corresponding signal to noise ratio (SNR) value, and the processing circuit identifies the sense signal having a highest SNR value to decode the data from the adjacent pattern.

4. The apparatus of claim 1, wherein the first sensor from the plurality of sensors is selected responsive to the first servo control field on the first track, and the first sensor is thereafter used to decode data patterns of the first track following the first servo control field.

5. The apparatus of claim 4, wherein a different, third sensor from the plurality of sensors is selected responsive to a different, second servo control field on the first track following the first servo control field, and the third sensor is thereafter used to decode data patterns on the first track following the second servo control field.

6. The apparatus of claim 1, wherein the processing circuit combines the sense signals from multiple sensors of said plurality of sensors to decode the data from the first track, and uses the sense signal from a single sensor of said plurality of sensors to decode the data from the second track.

7. The apparatus of claim 1, wherein the processing circuit comprises a preamp circuit of a data storage device coupled to each of the plurality of sensors.

8. The apparatus of claim 1, wherein the processing circuit further comprises a read channel within a channel system on chip (SOC) which receives the generated sensor signals along different differential signal paths that interconnect the sensors with the SOC to concurrently decode the data from the first and second tracks, the decoded data from the first and second tracks decoded using different combinations of the sensors over a revolution of a data recording surface on which the first and second tracks are disposed.

9. The apparatus of claim 1, wherein the processing circuit further operates to detect an offtrack condition comprising a misalignment of the plurality of sensors relative to the first and second tracks responsive to relative amplitudes of the generated sense signals, and to correct the misalignment by radially advancing the plurality of sensors relative to the track.

10. The apparatus of claim 1, wherein the plurality of sensors comprises a first sensor which provides sense signals used to decode the data from the first track, a second sensor which provides sense signals used to decode the data from the second track, and a third sensor between the first and second sensors.

11. An apparatus comprising:
a plurality of adjacent sensors each configured to generate, from a common pattern, a sense signal having an associated signal to noise ratio (SNR); and
a processing circuit configured to identify a selected sense signal from the generated sense signals having the highest SNR, to decode data from the common pattern using the selected sense signal, and to transfer the decoded data to a host device.

12. The apparatus of claim 11, wherein the sensors are magnetically responsive read sensors affixed to a transducer assembly supported adjacent a rotatable data storage medium, and the common pattern comprises a circumferentially extending track on the medium.

13. The apparatus of claim 12, wherein the processing circuit comprises a preamp connected to each of the plurality of MR read sensors via a different respective conductive path, and a channel system on chip (SOC) connected to the preamp, wherein the preamp is configured to forward the selected sense signal to the channel SOC.

14. The apparatus of claim 13, wherein the preamp further comprises a pass-through stage so that each of the sense signals from the plurality of sensors is forwarded to the channel SOC along a different conductive path, and data from multiple tracks in the common pattern are concurrently decoded using the sense signals forwarded to the SOC.

15. A method comprising:
positioning a plurality of sensors adjacent a common pattern;
using the plurality of sensors to generate a corresponding plurality of sense signals from the common pattern;
decoding data from the common pattern using the plurality of sense signals wherein a first sensor of the plurality of sensors is selected to decode a first portion of the decoded data and a different, second sensor of the plurality of sensors is selected to decode a second portion of the decoded data; and
transferring the decoded data to a host device responsive to a host request for the decoded data.

16. The method of claim 15, wherein each of the generated sense signals has a corresponding signal to noise ratio (SNR) value, and the data are decoded by identifying the sense signal having a highest SNR value from among the generated sense signals at different times during the decoding of the data, the first sensor having the highest SNR value for the first portion of the decoded data and the second sensor having the highest SNR value for the second portion of the decoded data.

17. The method of claim 15, wherein the using step comprises reading a servo control field on a track defined on a rotating storage medium and identifying the sense signal having the largest amplitude as the servo control field is read, wherein the sensor corresponding to the identified sense signal is thereafter used to decode data bits on the track that follow the servo control field.

18. The method of claim 15, wherein the first portion of the decoded data comprise a first portion of data on a circumferentially extending track, and the second portion of the decoded data comprise a second portion of data on the circumferentially extending track.

19. The method of claim 15, wherein the first portion of the decoded data comprise data from a first circumferentially extending track, and the second portion of the decoded data comprise data from an adjacent second circumferentially extending track.

* * * * *